(12) United States Patent
Ahn et al.

(10) Patent No.: US 7,534,832 B2
(45) Date of Patent: May 19, 2009

(54) IMPACT-REINFORCING AGENT HAVING MULTILAYERED STRUCTURE, METHOD FOR PREPARING THE SAME, AND THERMOPLASTIC RESIN COMPRISING THE SAME

(75) Inventors: Jeongheon Ahn, Suncheon (KR); Seon-Hee Han, Gwangju (KR); Kwang-Jin Lee, Busan (KR)

(73) Assignee: LG Chem, Ltd. (KR)

( * ) Notice: Subject to any disclaimer, the term of this patent is extended or adjusted under 35 U.S.C. 154(b) by 597 days.

(21) Appl. No.: 10/505,517

(22) PCT Filed: Dec. 26, 2002

(86) PCT No.: PCT/KR02/02437

§ 371 (c)(1),
(2), (4) Date: Sep. 6, 2005

(87) PCT Pub. No.: WO2004/058839

PCT Pub. Date: Jul. 15, 2004

(65) Prior Publication Data

US 2006/0074148 A1 Apr. 6, 2006

(30) Foreign Application Priority Data

Dec. 24, 2002 (KR) .................. 10-2002-0083517

(51) Int. Cl.
*C08L 53/00* (2006.01)
(52) U.S. Cl. .............. 525/80; 525/89; 525/90; 525/316
(58) Field of Classification Search ............. 523/201; 525/89, 80, 90, 316
See application file for complete search history.

(56) References Cited

U.S. PATENT DOCUMENTS

| | | | |
|---|---|---|---|
| 4,173,596 A | 11/1979 | De Witt | 428/402 |
| 5,298,559 A * | 3/1994 | Fujii et al. | 525/67 |
| 6,861,475 B2 * | 3/2005 | Ilenda et al. | 525/80 |
| 7,173,082 B2 * | 2/2007 | Ahn et al. | 524/458 |

FOREIGN PATENT DOCUMENTS

| | | |
|---|---|---|
| CN | 1185165 A | 6/1998 |
| CN | 1277622 A | 12/2000 |
| EP | 0 132 339 B1 | 1/1985 |
| EP | 0 465 792 A2 | 1/1992 |
| JP | 05-140410 | 6/1993 |
| JP | 5-222140 | 8/1993 |
| JP | 7-53835 | 2/1995 |
| KR | 1996-0022608 | 7/1996 |
| KR | 1999-0060688 | 7/1999 |
| KR | 1999-0087883 | 12/1999 |

OTHER PUBLICATIONS

PCT International Search Report; International Application No. PCT/KR02/02437; International Filing Date: Dec. 26, 2002; Date of Mailing: Sep. 17, 2003.

* cited by examiner

*Primary Examiner*—Bernard Lipman
(74) *Attorney, Agent, or Firm*—Cantor Colburn LLP

(57) ABSTRACT

The present invention relates to an acrylic impact modifier having a multilayered structure, which offers both superior impact resistance and coloring characteristics to engineering plastics, such as polycarbonate (PC) and a polycarbonate/polybutylene terephthalate alloy resin, or to a polyvinyl chloride resin. The present invention provides an acrylic impact modifier having a multilayered structure comprising: a) a seed prepared by emulsion copolymerization of a vinylic monomer and a hydrophilic monomer; b) a rubbery core surrounding the seed and comprising a $C_2$ to $C_8$ alkyl acrylate polymer, and c) a shell surrounding the rubbery core and comprising a $C_1$ to $C_4$ alkyl methacrylate polymer, a method for preparing the same, and a thermoplastic resin comprising the same.

15 Claims, No Drawings

IMPACT-REINFORCING AGENT HAVING MULTILAYERED STRUCTURE, METHOD FOR PREPARING THE SAME, AND THERMOPLASTIC RESIN COMPRISING THE SAME

BACKGROUND OF THE INVENTION (a) Field of the Invention

The present invention relates to an acrylic impact modifier having a multilayered structure, which is prepared by multistep emulsion polymerization, a method for preparing the same, and a thermoplastic resin comprising the polymer as an impact modifier (b) Description of the Related Art A polycarbonate resin is widely used for molding products of automobiles and electric/electronic products due to its superior impact resistance, electrical properties, and heat resistance. However, the polycarbonate resin has a high melt viscosity and poor molding property. Moreover, its impact resistance is highly dependent on thickness, and its chemical resistance is also poor. Accordingly, PC/ABS, an alloy of PC and acrylonitrile-butadiene-styrene (ABS), is used to compensate for the high melt viscosity of polycarbonate (PC), or a resin such as polybutylene terephthalate is mixed with PC to compensate for its chemical resistance.

European Patent Publication No. 465,792 discloses a polymer comprising a rubbery acrylate monomer, which improves impact resistance of polycarbonate and offers uniform coloring property when used together with a pigment, and a resin composition prepared by blending the polymer with polycarbonate. However, such a modified polycarbonate does not have enough impact resistance. Although the acryl-based polymer can be used as an impact modifier in thermoplastic resins, such as a polybutylene terephthalate resin and a polyvinyl chloride (PVC) resin, as well as in polycarbonate, the balance of impact resistance and coloring property is insufficient, as yet.

SUMMARY OF THE INVENTION

It is an object of the present invention to provide an acrylic impact modifier having a multilayered structure, which is prepared by multistep emulsion polymerization, to offer superior impact resistance to a thermoplastic resin, and a method for preparing the same.

It is another object of the present invention to provide an acrylic impact modifier capable of offering uniform coloring along with superior impact resistance to a thermoplastic resin, and a method for preparing the same.

It is still another object of the present invention to provide a thermoplastic resin comprising an acrylic impact modifier capable of offering both superior impact resistance and coloring property.

In order to achieve these objects, the present invention provides acrylic impact modifier composition having a multilayered structure, which comprises:

a) 0.5 to 40 parts by weight (based on the weight of total composition) of a seed comprising a copolymer of vinyl monomers and hydrophilic monomers, comprising:
  on the basis of the total weight of the seed monomers,
  i) 65 to 99.4 parts by weight of vinyl monomers;
  ii) 0.5 to 30 parts by weight of hydrophilic monomers; and
  iii) 0.1 to 5 parts by weight of crosslinking monomers;

b) 50 to 89.5 parts by weight (based on the weight of total composition) of a rubbery core surrounding the seed and comprising:
  on the basis of the weight of the core monomers,
  i) 95.0 to 99.9 parts by weight of $C_2$ to $C_8$ alkyl acrylate or diene monomers; and
  ii) 0.1 to 5.0 parts by weight of crosslinking monomers; and c) 10.0 to 49.5 parts by weight (based on the weight of total composition) of a shell surrounding the rubbery core and comprising:
  on the basis of the weight of the shell monomers,
  i) 95.0 to 99.9 parts by weight of $C_1$ to $C_4$ alkyl methacrylate; and
  ii) 0.1 to 5.0 parts by weight of crosslinking monomers.

The present invention also provides a method for preparing an acrylic impact modifier having a multilayered structure, which comprises the steps of:

a) conducting a crosslinking reaction of a monomer mixture comprising:
  on the basis of the weight of seed monomers,
  i) 65 to 99.4 parts by weight of vinyl monomers;
  ii) 0.5 to 30 parts by weight of hydrophilic monomers; and
  iii) 0.1 to 5 parts by weight of crosslinking monomers
  by emulsion polymerization to prepare a seed latex comprising a copolymer of vinyl monomers and hydrophilic monomers;

b) adding 50 to 89.5 parts by weight (based on the weight of total composition) of a monomer mixture comprising:
  on the basis of the weight of core monomers,
  i) 95.0 to 99.9 parts by weight of $C_2$ to $C_8$ alkyl acrylate or diene monomers; and
  ii) 0.1 to 5.0 parts by weight of crosslinking monomers
  to 0.5 to 40 parts by weight (based on the weight of total composition) of the seed latex of the step a) and conducting an emulsion polymerization to prepare a rubbery core latex; and c) adding 10.0 to 49.5 parts by weight (based on the weight of total composition) of a monomer mixture comprising:
  on the basis of the weight of shell monomers,
  i) 95.0 to 99.9 parts by weight of $C_1$ to $C_4$ alkyl methacrylate; and
  ii) 0.1 to 5.0 parts by weight of crosslinking monomers
  to 50.5 to 90 parts by weight (based on the weight of total composition) of the rubbery core latex of the step b) and conducting an emulsion graft polymerization to form a outer shell of the rubbery core, and thereby preparing an acrylic impact modifier.

The present invention also provides a thermoplastic resin comprising the acrylic impact modifier having a multilayered structure.

DETAILED DESCRIPTION OF THE PREFERRED EMBODIMENTS

Hereinafter, the present invention is explained in more detail.

The present inventors found out that an acryl-based polymer having a multilayered structure prepared by multistep emulsion polymerization can improve impact resistance and coloring property of a polyvinyl chloride resin, as well as engineering plastics including polycarbonate (PC) and a PC/PBT alloy.

The present invention prepares an acrylic impact modifier having a multilayered structure of a seed, a core, and a shell by a) conducting an emulsion copolymerization of vinyl monomers and hydrophilic monomers to prepare a seed latex, b) adding a $C_2$ to $C_8$ alkyl acrylate monomer to the seed latex and conducting an emulsion polymerization to prepare a rubbery core latex, and c) adding $C_1$ to $C_4$ alkyl methacrylate monomers to the core latex and conducting an emulsion graft polymerization to form a hard shell.

The present invention is characterized by an acrylic impact modifier having a multilayered structure of a seed, a core, and a shell, and by using a copolymer of vinyl monomers and hydrophilic monomers having a high glass transition temperature as a polymerization seed. In particular, an acrylic impact modifier prepared by controlling the degree of crosslinkng, polarity and particle size of the seed latex, i.e., varying the contents of the crosslinking agent, the hydrophilic comonomer, and the emulsifying agent in the seed, offers superior impact resistance and excellent coloring property to engineering plastics such as polycarbonate (PC) and PC/PBT alloy, and a thermoplastic resin such as polyvinyl chloride resin, which comprise the impact modifier.

For the seed comprised in the rubbery core, vinyl nonpolar monomers having a relatively high glass transition temperature ($T_g$), such as a styrene monomer, and hydrophilic monomers, such as polar acrylonitrile, methyl methacrylate, and polar ethyl acrylate having glass transition temperature ($T_g$) of below room temperature, can be copolymerized to control the polarity and glass transition temperature of the seed. Also, monomers having hydroxy, carboxyl, or epoxy functional groups, such as methacryl-based acid, hydroxymethyl methacrylate, and glycidyl methacrylate, can be copolymerized with styrene monomers to prepare a seed latex having functional groups. The degree of crosslinking, gel content, and particle size can be controlled by varying the contents of the crosslinking agent and the emulsifying agent of the seed particle. An acrylic impact modifier having a multilayered structure prepared from the above seed offers improved impact resistance and excellent coloring property to engineering plastics including polycarbonate.

The seed will be explained in more detail.

The seed of the present invention is prepared by copolymerizing vinyl monomers having glass transition temperature above room temperature, such as styrene, with polar monomers. The prepared copolymer is used as a polymerization seed of an acryl-based polymer. The degree of crosslinking, polarity, and particle size of the seed particle are controlled by the contents of the crosslinking agent, hydrophilic comonomer, and emulsifying agent. As a result, an acrylic impact modifier capable of offering both superior impact resistance and coloring property to a thermoplastic resin is obtained.

For this purpose, the seed of the present invention is prepared by crosslinking:

on the basis of 100 parts by weight of the total seed monomers, i) 65 to 99.4 parts by weight of vinyl monomers;

ii) 0.5 to 30 parts by weight of hydrophilic comonomers, which is copolymerizable with i) the vinylic monomer; and iii) 0.1 to 5 parts by weight of crosslinking monomers by emulsion polymerization in appropriate amount of water to prepare a seed latex comprising a copolymer of vinyl monomers and hydrophilic monomers. Of course, a conventional polymerization initiator, emulsifying agent, or electrolyte can be used in the crosslinking reaction.

The above monomer composition range affects basic properties of the acrylic impact modifier. If the content of each monomer used falls outside the above range, it is difficult to obtain an impact modifier having a multilayered structure with superior impact resistance and coloring characteristics.

Preferably, the particle size of the seed latex is 40 to 200 nm for convenience in subsequent polymerization and grafting steps.

Preferably, i) the vinylic monomer is selected from the group consisting of styrene, α-methylstyrene, vinyltoluene, and 3,4-dichlorostyrene.

ii) The hydrophilic monomer is a monomer that is copolymerizable with i) the vinyl monomer, and preferably, it is selected from the group consisting of: an alkyl acrylate, such as ethyl acrylate; an alkyl methacrylate, such as methyl methacrylate, glycidyl methacrylate, and benzyl methacrylate; methacryl-based acid; acrylonitrile; and methacrylonitrile.

iii) The crosslinking monomer may be selected from the group consisting of divinylbenzene, 3-butanediol diacrylate, 1,3-butanediol dimethacrylate, 1,4-butanediol diacrylate, 1,4-butanediol dimethacrylate, allyl acrylate, allyl methacrylate, trimethylolpropane triacrylate, tetraethyleneglycol diacrylate, and tetraethyleneglycol dimethacrylate. Particularly, divinyl benzene is preferable to efficiently improve crosslinkage of the vinyl monomer.

The rubbery core will be explained in more details.

The rubbery core is prepared by adding 50 to 89.5 parts by weight of a monomer mixture comprising:

on the basis of 100 parts by weight of core monomers, i) 95.0 to 99.9 parts by weight of C2 to C8 alkyl acrylate or diene monomers; and ii) 0.1 to 5.0 parts by weight of crosslinking monomers to 0.5 to 40 parts by weight of the above-prepared seed latex comprising the copolymer of vinyl monomers and hydrophilic monomers, and conducting an emulsion polymerization to prepare a rubbery core latex. Of course, a conventional emulsifying agent or polymerization initiator can be used in the emulsion polymerization.

The polyalkylacrylate used in the rubbery core has a low glass transition temperature that is below 25° C., and thus imparts impact resistance to the impact modifier of the present invention. Also, since there remains no double bond after polymerization, decomposition by UV and decrease of impact resistance therefrom can be prevented. Besides alkyl acrylate, a diene monomer having at least two non-conjugated carbon-carbon double bonds, such as 1,3-butadiene, can be used for the core.

The alkyl acrylate may be selected from the group consisting of ethyl acrylate, propyl acrylate, isopropyl acrylate, butyl acrylate, hexyl acrylate, octyl acrylate, and 2-ethylhexyl acrylate. And, in order to control glass transition temperature, allyl methacrylate such as methylmethacrylate can be added as supplementary monomers in and amount of less than 5 parts by weight, based on 100 parts by weight of the total core monomers.

As a result, the rubbery core is a polymer comprising monomers selected from the group consisting of $C_2$ to $C_8$ alkyl acrylate and diene monomers, and the seed monomers.

The crosslinking monomer of the rubbery core stabilizes the latex and helps the impact modifier to maintain its structure in the matrix during processing. If the degree of crosslinking in the rubbery core is insufficient, the latex may be unstable, and the impact resistance and the weather resistance may deteriorate due to non-uniform dispersion in the matrix. And, if the degree of crosslinking is excessive, impact resistance also deteriorates. Therefore, it is preferable to use 0.1 to 5.0 parts by weight of the crosslinking monomers in the core layer. If the content of the crosslinking monomer is less than 0.1 part by weight of the total monomers, it is difficult to maintain the particle shape during processing. And, if the content of the crosslinking monomer exceeds 5.0 parts by weight, the core becomes brittle, thus the impact resistance decreases.

The crosslinking monomer of the rubbery core may be selected from the group consisting of 3-butanediol diacrylate, 1,3-butanediol dimethacrylate, 1,4-butanediol diacrylate, 1,4-butanediol dimethacrylate, allyl acrylate, allyl methacrylate, trimethylolpropane triacrylate, tetraethyleneglycol diacrylate, tetraethyleneglycol dimethacrylate, and divinylbenzene.

The glass transition temperature of the polymer prepared in the process of preparing the rubbery core is 25° C. or less, preferably 0° C. or less, and more preferably −40° C. or less.

When polymerizing the rubbery core, the monomers may be fed in by a variety of methods. Particularly, in the step b), the emulsion is preferably i) introduced by power feeding, which introduces the emulsion in the reactor while gradually increasing the content of a monomer having a higher glass transition temperature in the emulsion; ii) simultaneously introduced; iii) continuously introduced; or iv) continuously introduced to seed latex for 1 to 2 hours together with a solvent that dissolves the monomer.

The shell formation will be explained in more detail.

The shell is prepared by adding 10.0 to 49.5 parts by weight of a monomer m mixture comprising:

on the basis of 100 parts by weight of total shell monomers,
i) 95.0 to 99.9 parts by weight of $C_1$ to $C_4$ alkyl methacrylate; and
ii) 0.1 to 5.0 parts by weight of crosslinking monomers to 50.5 to 90 parts by weight of the rubbery core latex of the step b), and conducting an emulsion graft polymerization to form a outer shell of the rubbery core, and thereby preparing an impact modifier latex. Of course, a conventional emulsifying agent or polymerization initiator may be used in the emulsion graft polymerization.

The shell is prepared by graft polymerization of an alkyl acrylate monomer that is compatible with a polycarbonate resin, such as methyl methacrylate, on the core surface. Particularly, methyl methacrylate is highly compatible with the matrix and has a relatively high glass transition temperature, so that it improves coagulation characteristics of the latex.

The shell may be prepared by further adding a small amount of monomers having functional groups other than alkyl methacrylate, if necessary, and conducting a graft polymerization. Specifically, in order to control glass transition temperature of the shell, a supplementary monomer, such as an alkyl acrylate such as ethyl acrylate, methyl acrylate, and butyl acrylate, and styrene, etc. may be used. And, in order to improve compatibility with the matrix, a nitrile-based monomer, such as acrylonitrile and methacrylonitrile may be used. The supplementary monomer may be used alone or in combination. Preferably, it is used in an amount of 0.5 to 10 parts by weight, based on 100 parts by weight of the total shell monomers.

The crosslinking monomer used in the shell polymerization may be the same as that used in the polymerization of the rubbery core, and its function is identical.

For the emulsifying agent used in each step of the present invention, the conventional emulsifying agents may be used alone or in combination. It is preferable to use alkali metal salts of weak acids, such as a fatty acid salt, considering the relationship with the matrix polymer.

For the polymerization initiator used in each step of the present invention, any compound that induces reaction may be used. For example, ammonium persulfate, potassium persulfate, benzoyl peroxide, azobisbutyronitrile, butyl hydroperoxide, cumene hydroperoxide, and dodecylbenzenesulfonic acid may be used. Persulfate, hydroperoxide, or dodecylbenzenesulfonic acid initiators may be used depending on the characteristics of the seed, core, and shell monomers or the system stability.

The impact modifier latex of the present invention is finally coagulated. Ion exchange water is added to reduce the solid content of the latex to below 15 wt %. Then, hydrochloric acid or sulfuric acid is used to coagulate the latex. Then, the coagulated mixture is heated to over 90° C., aged, and cooled. The mixture is washed with ion exchange water, and then filtered and dried to obtain the impact-reinforcing agent.

The prepared impact modifier having a multilayered structure has a particle size ranging from 100 to 600 nm, and offers improved impact resistance and coloring property to engineering plastics including polycarbonate.

The thermoplastic resin provided by the present invention, such as a polycarbonate resin, a polybutylene terephthalate resin, a polycarbonate/polybutylene terephthalate alloy resin, and a polyvinyl chloride resin, comprises 80 to 99.5 parts by weight of a thermoplastic resin and 0.5 to 20 parts by weight of the acrylic impact modifier having a multilayered structure, and therefore it has superior impact resistance and coloring property.

The thermoplastic resin comprising the impact modifier having a multilayered structure of the present invention may be molded into products of various shapes by the conventional molding methods, including extrusion molding, injection molding, and compression molding, at an adequate temperature range (e.g., 210 to 290° C. for a polycarbonate resin). The molded products may be used for automobile exteriors, office equipment, electric appliances, mobile phone housings, and so forth.

Hereinafter, the present invention is described in more detail through examples and comparative examples. However, the following examples are only for the understanding of the present invention, and the present invention is not limited by the following examples.

EXAMPLES

Example 1

(Preparation of Seed Latex)

970.60 g of ion exchange water was fed into a reactor. The reactor was heated to 75° C. while washing it with a nitrogen flow. When the temperature of the ion exchange water reached 75° C., 82.75 g of styrene (ST), 14.25 g of acrylonitrile (AN), 2.0 g of allyl methacrylate (AM), and 1.0 g of divinylbenzene were fed simultaneously together with 1.5 g of fatty acid potassium salt and 2.5 g of sodium bicarbonate.

When the temperature of the reactor was stabilized at 70° C., potassium persulfate was added to initiate polymerization. The reactor was continuously sparged with nitrogen throughout the reaction.

The particle size of the polymerized latex was measured by a NICOMP laser light scattering system to be 135 nm.

(Formation of Rubbery Core)

The core was polymerized by power feeding a monomer emulsion solution into a reactor.

Firstly, the prepared seed was fed into a reactor, so that its content was 10 parts by weight, based on 100 parts by weight of the total impact modifier, and the temperature of the reactor was maintained at 70° C. At the same time, two kinds of emulsions were prepared in separate tanks: emulsion 1 was prepared by adding ionized water to 48.52 g of butyl acrylate (BA), 0.18 g of allyl methacrylate (AMA), and 0.57 g of fatty acid potassium salt in tank 1, and stirring the same (solid content=60 wt %); and emulsion 2 was prepared by adding ionized water to 4.98 g of methyl methacrylate (MMA), 0.02 g of allyl methacrylate (AMA), and 0.06 g of fatty acid potassium salt in tank 2, and stirring the same (solid content=60 wt %).

While mixing the emulsion 2 with the emulsion 1 by adding the emulsion 2 to the emulsion 1 at a constant rate, the mixture solution of the emulsion 1 and the emulsion 2, whose composition was changing continuously, was fed into the reactor over 2 hours.

An apparatus was set up so that 40.2 g of ion exchange water, 0.008 g of FES (ferrous sulfate), 0.143 g of EDTA (disodium ethylenediaminetetraacetate), 0.25 g of SFS (formaldehyde sodium sulfoxylate), and 0.07 g of t-butyl hydroperoxide could be fed into the reactor from the beginning of reaction (when feeding the monomer into the tank 1 starts) to the completion of reaction. FES, EDTA, and SFS were fed into the reactor in 3 wt % aqueous solution, and the reaction proceeded under a nitrogen flow.

One hour of aging time was given after the reaction was completed.

(Formation of Shell)

20.0 g of ion exchange water, 29.868 g of methyl methacrylate (MMA), 0.0195 g of allyl methacrylate (AMA), and 0.054 g divinylbenzene were fed into the reactor. Then, 0.20 g of SFS and 0.05 g t-butyl hydroperoxide were added in succession to initiate the reaction. FES, EDTA, and SFS were fed into the reactor in 3 wt % aqueous solution, and the reaction proceeded under a nitrogen flow. The final particle size of the prepared latex A was measured by a NICOMP laser light scattering system to be 295 nm.

(Preparation of Impact Modifier Powder)

Ion exchange water was added to the above prepared latex to reduce the final solid content to below 15 wt %. Then, 2 wt % of hydrochloric acid or sulfuric acid was slowly added. The prepared slurry type mixture was heated to over 90° C., aged, and then cooled. The mixture was washed with ion exchange water, and then filtered and dried to obtain an impact modifier powder.

Example 2

An impact modifier was prepared by the same method as in Example 1, except that the contents of styrene (ST) and acrylonitrile (AN) were respectively changed to 68.5 g and 28.5 g, respectively, when preparing the seed latex.

Example 3

An impact modifier was prepared by the same method as in Example 1, except that the contents of styrene (ST) and acrylonitrile (AN) were respectively changed to 54.25 g and 42.75 g, respectively, when preparing the seed latex.

Examples 4 to 6

Impact modifiers were prepared by the same methods as in Examples 1, 2, and 3, respectively, except using methyl methacrylate (MMA) instead of acrylonitrile (AN), when preparing the seed latex.

Examples 7 to 12

Impact modifiers were prepared by the same methods as in Examples 1 to 6, respectively, except that the monomers are simultaneously introduced after introducing the emulsifying agent instead of power feeding, when polymerizing the rubber-like core.

Examples 13 to 18

Impact modifiers were prepared by the same methods as in Examples 1 to 6, respectively, except that the mixture solution of the emulsion 1 and the emulsion 2 was introduced for 2 hours instead of power feeding, when polymerizing the rubbery core.

Examples 19 to 24

When polymerizing the rubbery core, a mixture solution of butyl acrylate and methyl methacrylate was mixed with the same amount (weight) of toluene, and the emulsifying agent was added to the mixture solution. This solution was fed into a reactor containing the seed latex for 1 hour and 20 minutes for polymerization. The reactor containing the seed latex had the same amount of FES, EDTA, t-butyl hydroperoxide, and ion exchange water as in Example 1. Impact modifiers were prepared with other conditions identical to those of Examples 1 to 6. After the shell polymerization was completed, toluene was removed with a rotary evaporator, and then the coagulation was performed.

Examples 25 to 30

Impact modifiers were prepared by the same methods as in Examples 1 to 6, respectively, except using t-butyl hydroperoxide (TBHP) instead of potassium persulfate as a polymerization initiator, when polymerizing the seed latex.

Examples 31 to 36

Impact modifiers were prepared by the same methods as in Examples 1 to 6, respectively, except replacing 5 wt % of methyl methacrylate (MMA) with ethyl acrylate (EA), while polymerizing the shell.

Example 37

An impact modifier was prepared by the same method as in Example 1, except using 1,3-butadiene (BD) instead of butyl acrylate (BA), while polymerizing the rubber-like core.

Comparative Example 1

An impact modifier was prepared by the same method as in Example 1, except using 97.0 g of styrene (ST) alone as monomers, when polymerizing the seed latex.

Comparative Example 2

An impact modifier was prepared by the same method as in Example 1, except using 82.75 g of styrene (ST) and 14.25 g of acrylonitrile (AN) instead of butyl acrylate (BA) as monomers, when polymerizing the seed latex.

Comparative Example 3

An impact modifier was prepared by the same method as in Example 1, except using 97.0 g of butyl acrylate (BA) alone as monomers, when polymerizing the seed latex.

Comparative Example 4

An impact modifier was prepared by the same method as in Example 1, except using 97.0 g of 1,2-butadiene (BD) alone as monomers, when polymerizing the seed latex.

Comparative Example 5

An impact modifier was prepared by the same method as in Comparative Example 1, except that the monomers were simultaneously introduced after feeding the emulsifying agent instead of power feeding, when polymerizing the rubbery core.

Comparative Example 6

An impact modifier was prepared by the same method as in Comparative Example 1, except that the mixture solution of the emulsion 1 and the emulsion 2 was introduced for 2 hours instead of power feeding, when polymerizing the rubbery core.

Comparative Example 7

When polymerizing the rubbery core, a mixture solution of butyl acrylate and methyl methacrylate was mixed with the same amount (weight) of toluene, and the emulsifying agent was added to the mixture solution. This solution was fed into a reactor containing the seed latex for 1 hour and 20 minutes for polymerization. The reactor containing the seed latex had the same amount of FES, EDTA, t-butyl hydroperoxide, and ion exchange water as in Comparative Example 2. An impact modifier was prepared with other conditions identical to that of Comparative Example 2. After the shell polymerization was completed, toluene was removed with a rotary evaporator, and then the coagulation was initiated.

Example 38

(Preparation of Polycarbonate (PC) Thermoplastic Resin)
100 parts by weight of a dried polycarbonate (LUPOY HI 1002 ML) and 3 parts by weight of the impact modifier having a multilayered structure prepared in each Example, 0.5 part by weight of additives, and 0.02 part by weight of a pigment were mixed, and extruded with a W/P ZSK 40Φ extruder to obtain a pellet.

The pellet was injected in a Batten 75T injector of about 280° C. to prepare an Izod impact specimen according to ASTM D-256. The coloring property was examined with naked eyes.

The test results are shown in the following Tables 1 to 5, along with the results of the impact-reinforcing agents of Comparative Examples 1 to 7. In Tables 1 to 5: ○ stands for superior; Δ stands for moderate; and X stands for poor.

TABLE 1

| Classification | | Example 1 | Example. 2 | Example 3 | Example 4 | Example 5 | Example 6 |
|---|---|---|---|---|---|---|---|
| Seed composition (parts by weight) | ST | 82.75 | 68.50 | 54.25 | 82.75 | 68.50 | 54.25 |
| | AN | 14.25 | 28.50 | 42.75 | 0 | 0 | 0 |
| | MMA | 0 | 0 | 0 | 14.25 | 28.50 | 42.75 |
| Izod impact strength (0° C., kg · cm/cm) | | 74.5 | 75.8 | 72.6 | 75.3 | 72.1 | 73.5 |
| Coloring property | | ○ | ○ | ○ | ○ | ○ | ○ |

| Classification | | Comparative Example 1 | Comparative Example 2 | Comparative Example 3 | Comparative Example 4 |
|---|---|---|---|---|---|
| Seed composition (parts by weight) | ST | 97.0 | 82.75 | 0 | 0 |
| | BA | 0 | 14.25 | 97.0 | 0 |
| | BD | 0 | 0 | 0 | 97.0 |
| Izod impact strength (0° C., kg · cm/cm) | | 49.3 | 54.7 | 77.3 | 81.2 |
| Coloring | | Δ | X | X | X |

TABLE 2

| Classification | | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|
| Seed Composition (parts by weight) | ST | 82.75 | 68.50 | 54.25 | 82.75 | 68.50 | 54.25 | 82.75 | 68.50 | 54.25 | 82.75 | 68.50 | 54.25 |
| | AN | 14.25 | 28.50 | 42.75 | 0 | 0 | 0 | 14.25 | 28.50 | 42.75 | 0 | 0 | 0 |
| | MMA | 0 | 0 | 0 | 14.25 | 28.50 | 42.75 | 0 | 0 | 0 | 14.25 | 28.50 | 42.75 |
| Core monomer feeding method | | Simultaneously | | | | | | Continuously | | | | | |
| Izod impact strength (0° C., kg · cm/cm) | | 69.8 | 73.1 | 72.0 | 73.2 | 70.1 | 70.0 | 73.8 | 74.6 | 72.3 | 76.3 | 72.6 | 68.1 |
| Coloring property | | ○ | Δ | ○ | Δ | ○ | ○ | ○ | ○ | ○ | ○ | ○ | ○ |

| Classification | | Comparative Example 5 | Comparative Example 6 |
|---|---|---|---|
| Seed composition (parts by weight) | ST | 97.0 | 97.0 |
| | BA | 0 | 0 |
| | BD | 0 | 0 |
| Core monomer feeding method | | Simultaneously | Continuously |
| Izod impact strength (0° C., kg · cm/cm) | | 39.2 | 38.0 |
| Coloring | | Δ | Δ |

TABLE 3

| Classification | | Ex. 19 | Ex. 20 | Ex. 21 | Ex. 22 | Ex. 23 | Ex. 24 | Comp. Ex. 7 |
|---|---|---|---|---|---|---|---|---|
| Seed Composition (parts by weight) | ST | 82.75 | 68.50 | 54.25 | 82.75 | 68.50 | 54.25 | 82.75 |
| | AN (BA for Comp. Examples) | 14.25 | 28.50 | 42.75 | 0 | 0 | 0 | 14.25 |
| | MMA (BD for Comp. Examples) | 0 | 0 | 0 | 14.25 | 28.50 | 42.75 | 0 |
| Core monomer feeding method | | \multicolumn{7}{c}{Continuously (solvent swelling)} | | | | | | | |
| Izod impact strength (0° C., kg · cm/cm) | | 74.3 | 75.1 | 72.6 | 73.2 | 71.5 | 71.2 | 46.8 |
| Coloring property | | ○ | ○ | ○ | ○ | ○ | ○ | X |

TABLE 4

| Classification | | Example 25 | Example 26 | Example 27 | Example 28 | Example 29 | Example 30 |
|---|---|---|---|---|---|---|---|
| Seed composition (parts by weight) | ST | 82.75 | 68.50 | 54.25 | 82.75 | 68.50 | 54.25 |
| | AN | 14.25 | 28.50 | 42.75 | 0 | 0 | 0 |
| | MMA | 0 | 0 | 0 | 14.25 | 28.50 | 42.75 |
| Initiator for seed polymerization | | | | | TBHP | | |
| Izod impact strength (0° C., kg · cm/cm) | | 68.4 | 70.2 | 71.6 | 65.2 | 63.1 | 63.8 |
| Coloring property | | ○ | ○ | Δ | Δ | Δ | Δ |

TABLE 5

| Classification | | Example 31 | Example 32 | Example 33 | Example 34 | Example 35 | Example 36 | Example 37 |
|---|---|---|---|---|---|---|---|---|
| Seed composition (parts by weight) | ST | 82.75 | 68.50 | 54.25 | 82.75 | 68.50 | 54.25 | 82.75 |
| | AN | 14.25 | 28.50 | 42.75 | 0 | 0 | 0 | 14.25 |
| | MMA | 0 | 0 | 0 | 14.25 | 28.50 | 42.75 | 0 |
| Core monomer composition (parts by weight) | BD | — | — | — | — | — | — | 48.52 |
| | AM | 48.52 | 48.52 | 48.52 | 48.52 | 48.52 | 48.52 | — |
| | MMA | 4.98 | 4.98 | 4.98 | 4.98 | 4.98 | 4.98 | 4.98 |
| Shell monomer composition (parts by weight) | EA | 1.49 | 1.49 | 1.49 | 1.49 | 1.49 | 1.49 | — |
| | MMA | 28.38 | 28.38 | 28.38 | 28.38 | 28.38 | 28.38 | 29.87 |
| Izod impact strength (0° C., kg · cm/cm) | | 76.3 | 78.2 | 72.0 | 75.4 | 74.0 | 74.6 | 79.2 |
| Coloring property | | ○ | ○ | ○ | ○ | ○ | ○ | Δ |

Example 39

(Preparation of PC/PBT Alloy Thermoplastic Resin)

100 parts by weight of a PC/PBT alloy resin (LUPOX TE-5000G), 8 parts by weight of the impact modifier having a multilayered structure prepared in Example 1, 0.5 part by weight of a processing additive, and 0.02 part by weight of a pigment were mixed, and extruded with a W/P ZSK 40Φ extruder to obtain a pellet. The pellet was injected in a Batten 75T injector of about 280° C. to prepare an Izod impact specimen according to ASTM D-256. The coloring property was examined with naked-eyes.

The test results are shown in the following Tables 6, along with the result of the impact-reinforcing agent of Comparative Example 1. In Tables 6: ○ stands for superior; Δ stands for moderate; and X stands for poor.

TABLE 6

| Classification | Impact-reinforcing agent of Example 1 | Impact-reinforcing agent of Comparative Example 1 |
|---|---|---|
| Matrix resin | PC/PBT | PC/PBT |
| Izod impact strength (0° C., kg · cm/cm) | 64.2 | 40.6 |
| Coloring property | ○ | ○ |

Example 40

(Preparation of Polyvinyl Chloride (PVC) Thermoplastic Resin)

100 parts by weight of a polyvinyl chloride resin (PVC; LG Chem's LS-100; degree of polymerization=1000), 4.0 parts by weight of a heat stabilizer (DLP), 0.9 part by weight of calcium stearate (Ca-St), 1.36 parts by weight of a polyethylene wax (PE wax), 1.0 part by weight of a processing additive (LG Chem's PA-821), 5.0 parts by weight of CaCO₃, and 4.0 parts by weight of TiO₂ were fed into a mixer at room temperature. Mixing was carried out at 1000 rpm while increasing the temperature to 115° C. When the temperature reached 115° C., the rate was decreased to 400 rpm and the temperature was lowered to 40° C. to obtain a master batch.

6 parts by weight of the impact modifier having a multilayered structure of Example 1 was added to the master batch. A 0.6 mm sheet was prepared by milling the same at 190° C. for 7 minutes using a two roll mill.

The sheet was cut to 150×200 mm, and put in a 3×170×220 mm mold with the milling direction aligned in one direction. The same was preheated for 8 minutes (0.5 Kg), compressed for 4 minutes (10 Kg), and cooled for 3 minutes (10 Kg) using a 190° C. heating press, to prepare a 3 mm-thick specimen.

The specimen was finely cut according to ASTM D-256 to prepare an Izod impact specimen.

The test results are shown in the following Table 7, along with the result of the impact modifier of Comparative Example 1.

TABLE 7

| Classification | Impact-reinforcing agent of Example 1 | Impact-reinforcing agent of Comparative Example 1 |
| --- | --- | --- |
| Matrix resin | PVC | PVC |
| Izod impact strength (0° C., kg · cm/cm) | 128 | 109 |

The acrylic impact modifier of the present invention is a polymer having a multilayered structure, which is prepared by multistep emulsion polymerization using a copolymer of vinyl monomers and hydrophilic monomers as a seed. It offers superior impact resistance and coloring property to engineering plastics, including polycarbonate (PC) and a PC/PBT alloy, and a polyvinyl chloride resin. Also, a thermoplastic resin comprising the impact modifier having a multilayered structure has superior impact resistance and coloring characteristics.

While the present invention has described in detail with reference to the preferred embodiments, those skilled in the art will appreciate that various modifications and substitutions can be made thereto without departing from the spirit and scope of the present invention as set forth in the appended claims.

What is claimed is:

1. An acrylic impact modifier having a multilayered structure, which comprises:
   a) 0.5 to 40 parts by weight (based on the weight of the total composition) of a seed comprising a copolymer of vinyl monomers and hydrophilic monomers, comprising:
      on the basis of the weight of the seed monomers,
      i) 65 to 99.4 parts by weight of vinyl monomers;
      ii) 0.5 to 30 parts by weight of hydrophilic monomers; and
      iii) 0.1 to 5 parts by weight of crosslinking monomers;
   b) 50 to 89.5 parts by weight (based on the weight of the total composition) of a rubbery core surrounding the seed and consisting essentially of:
      on the basis of the weight of the core monomers,
      i) 95.0 to 99.9 parts by weight $C_2$ to $C_8$ alkyl acrylate; and
      ii) 0.1 to 5.0 parts by weight of crosslinking monomers; and
   c) 10.0 to 49.5 parts by weight (based on the weight of the total composition) of a shell surrounding the a rubbery core and comprising:
      on the basis of the weight of the shell monomers,
      i) 95.0 to 99.9 parts by weight of $C_1$ to $C_4$ alkyl methacrylate; and
      ii) 0.1 to 5.0 parts by weight of crosslinking monomers.

2. The acrylic impact modifier having a multilayered structure according to claim 1, wherein the vinyl monomer of a)i) is selected from the group consisting of styrene, α-methylstyrene, vinyltoluene, and 3,4-dichlorostyrene.

3. The acrylic impact modifier having a multilayered structure according to claim 1, wherein the hydrophilic monomer of a) ii) is selected from the group consisting of ethyl acrylate, methyl methacrylate, glycidyl methacrylate, benzyl methacrylate, methacryl-based acid, acrylonitrile, and methacrylonitrile.

4. The acrylic impact modifier having a multilayered structure according to claim 1, wherein the crosslinking monomer of a) iii) is selected from the group consisting of divinylbenzene, 3-butanediol diacrylate, 1,3-butanediol dimethacrylate, 1,4-butanediol diacrylate, 1,4-butanediol dimethacrylate, allyl acrylate, allyl methacrylate, trimethyloipropane triacrylate, tetraethyleneglycol diacrylate, and tetraethyleneglycol dimethacrylate.

5. The acrylic impact modifier having a multilayered structure according to claim 1, wherein the alkyl acrylate of b) i) is selected from the group consisting of ethyl acrylate, propyl acrylate, isopropyl acrylate, butyl acrylate, hexyl acrylate, octyl acrylate, and 2-ethylhexyl acrylate.

6. The acrylic impact modifier having a multilayered structure according to claim 1, wherein the diene monomer of b) i) is 1,3-butadiene.

7. The acrylic impact modifier having a multilayered structure according to claim 1, wherein the crosslinking monomers of b) ii) and c) ii) are selected from the group consisting of 3-butanediol diacrylate, 1,3-butanediol dimethacrylate, 1,4-butanediol diacrylate, 1,4-butanediol dimethacrylate, allyl acrylate, allyl methacrylate, trimethylolpropane triacrylate, tetraethyleneglycol diacrylate, tetraethyleneglycol dimethacrylate, and divinylbenzene.

8. The acrylic impact modifier having a multilayered structure according to claim 1, wherein the shell of c) further comprises, on the basis of 100 parts by weight of the total shell monomers, 0.5 to 10 parts by weight of a supplementary monomer selected from the group consisting of methyl acrylate, ethyl acrylate, butyl acrylate, acrylonitrile, methacrylonitrile, and styrene.

9. The acrylic impact modifier having a multilayered structure according to claim 1, wherein the rubber-like core has glass transition temperature of 250° C. or less.

10. The acrylic impact modifier having a multilayered structure according to claim 1, wherein the acryl impact-reinforcing agent has a latex particle size of 100 to 600 nm.

11. A method for preparing an acrylic impact modifier having a multilayered structure, which comprises the steps of:
   a) conducting a crosslinking reaction of a monomer mixture comprising:
      on the basis of the weight of seed monomers,
      i) 65 to 99.4 parts by weight of vinyl monomers;
      ii) 0.5 to 30 parts by weight of hydrophilic monomers; and iii) 0.5 to 5 parts by weight of crosslinking monomers by emulsion polymerization to prepare a seed latex comprising a copolymer of vinyl monomers and hydrophilic monomers;

b) adding 50 to 89.5 parts by weight (based on the weight of core monomers) of a monomer mixture comprising: on the basis of the weight of core monomers, i) 95.0 to 99.0 parts by weight of $C_2$ to $C_8$ alkyl acrylate monomers; and ii) 0.1 to 5.0 parts by weight of crosslinking monomers to the seed latex comprising 0.5 to 40 parts by weight (based on the weight of total composition) of the copolymer of the step a), and conducting an emulsion polymerization to prepare a rubbery core latex; and c) adding 10.0 to 49:5 parts by weight (based on the weight of total composition) of a monomer mixture comprising: on the basis of the weight of shell monomers, i) 85.0 to 99.4 parts by weight of $C_1$ to $C_4$ alkyl methacrylate; and ii) 0.1 to 5.0 parts by weight of crosslinking monomers to 50.5 to 90 parts by weight (based on the weight of total composition) of the rubbery core latex comprising the rubbery core of the step b), and conducting and emulsion graft polymerization to form a outer shell of the rubbery core.

12. The method for preparing an acrylic impact modifier having a multilayered structure according to claim 11, wherein the seed latex prepared in the step a) has particle size of 40 to 200nm.

13. The method for preparing an acrylic impact modifier having a multilayered structure according to claim 11, wherein in step b), an emulsion is i) introduced by power feeding, which introduces the emulsion into a reactor while gradually increasing the content of a monomer having a higher glass transition temperature in the emulsion solution;

ii) simultaneously introduced;

iii) continuously introduced; or iv) continuously introduced for 1 to 2 hours together with a solvent that dissolves the monomer.

14. The method for preparing an acrylic impact modifier having a multilayered structure according to claim 11, wherein the emulsion of the step c) further comprises, on the basis of 100 parts by weight of the total shell monomers, 0.5 to 10 parts by weight of supplementary monomers selected from the group consisting of methyl acrylate, ethyl acrylate, butyl acrylate, acrylonitrile, methacrylonitrile, and styrene.

15. A thermoplastic resin comprising:

a. 80 to 99.5 parts by weight of a matrix resin selected from the group consisting of a polycarbonate resin, a polybutylene terephthalate resin, an alloy resin of polycarbonate and polybutylene terephthalate, and a polyvinyl chloride resin; and b. 0.5 to 20 parts by weight of the acrylic impact modifier having a multilayered structure according to claim 1.

* * * * *